United States Patent [19]

Serizawa et al.

[11] Patent Number: 4,557,591
[45] Date of Patent: Dec. 10, 1985

[54] PHOTOGRAPHIC PRINTING APPARATUS

[75] Inventors: Moriyoshi Serizawa, Hachioji; Haruo Hakamada, Tachilawa, both of Japan

[73] Assignee: Konishiroku Photo Industry Co., Ltd., Tokyo, Japan

[21] Appl. No.: 467,482

[22] PCT Filed: Jun. 11, 1982

[86] PCT No.: PCT/JP82/00226
§ 371 Date: Feb. 8, 1983
§ 102(e) Date: Feb. 8, 1983

[87] PCT Pub. No.: WO82/04485
PCT Pub. Date: Dec. 23, 1982

[30] Foreign Application Priority Data

Jun. 11, 1981 [JP] Japan .................................. 56-90333

[51] Int. Cl.⁴ .............................................. G03B 27/52
[52] U.S. Cl. ...................................... 355/40; 355/45; 355/56; 355/64; 355/65; 350/445; 350/446; 354/159; 354/210

[58] Field of Search ..................... 350/471, 445, 446; 355/40, 56, 60, 52, 45, 64, 65; 352/79, 232, 60; 354/123, 159, 210

[56] References Cited

U.S. PATENT DOCUMENTS

| 2,405,729 | 9/1946 | Altman | 350/471 X |
| 3,338,654 | 8/1967 | Clapp | 350/445 |
| 4,060,324 | 11/1977 | Wakatsuki | 355/60 |
| 4,135,810 | 1/1979 | Walter | 355/56 X |

FOREIGN PATENT DOCUMENTS

| 4936132 | 9/1976 | Japan . |
| 129029 | 11/1978 | Japan . |
| 55-98738 | 7/1980 | Japan . |

Primary Examiner—Russell E. Adams
Assistant Examiner—Della Rutledge
Attorney, Agent, or Firm—Jordan B. Bierman

[57] ABSTRACT

Disclosed herein is a photographic printing apparatus including at least one of image-rotating lenses 25 and 26 which enables the production of prints of the same size from photographic films both of full size and half size by a 45-degree rotation of said image-rotating lenses 25 and 26.

7 Claims, 6 Drawing Figures

PHOTOGRAPHIC PRINTING APPARATUS

DESCRIPTION

1. Technical Field

The present invention relates to a photographic printing apparatus which enables the printing of full size and half size picture film from 135 photographic film onto rolled photographic paper of the same width at the same size.

2. Background Art

Since a full size picture taken on 135 photographic film has a length-to-breadth ratio opposite to that of a half size picture taken on the same film, it has not been easy to obtain prints of the same size from full size and half size negatives in a conventional photographic printing apparatus in which rolled photographic paper sheet is used. To reverse the length-to-breadth ratio to obtain prints of the same size, it has so far been common practice to change the direction of advance of the negative film to the rolled photographic paper through an angle of 90 degrees, or to replace a full size negative by a half size negative and vice versa together with the replacement of the rolled photographic paper by that of a different width.

DISCLOSURE OF INVENTION

The purpose of the present invention is to obtain surely and simply prints of the same size from full size negatives and a half size negatives which does not involve the troublesome method as mentioned above, and this purpose can be attained by using a photographic printing apparatus characterized in that prints of the same size are obtained on photographic paper both from full size and half size photographic films by rotating an image-rotating lens through an angle of 45 degrees when it is fitted, in a photographic printing apparatus in which a plurality of lenses including at least one image-rotating lens are fitted interchangeably.

BEST MODE FOR CARRYING OUT THE INVENTION

The following is an explanation of an embodiment of the present invention with reference to the drawings.

Figure 1:
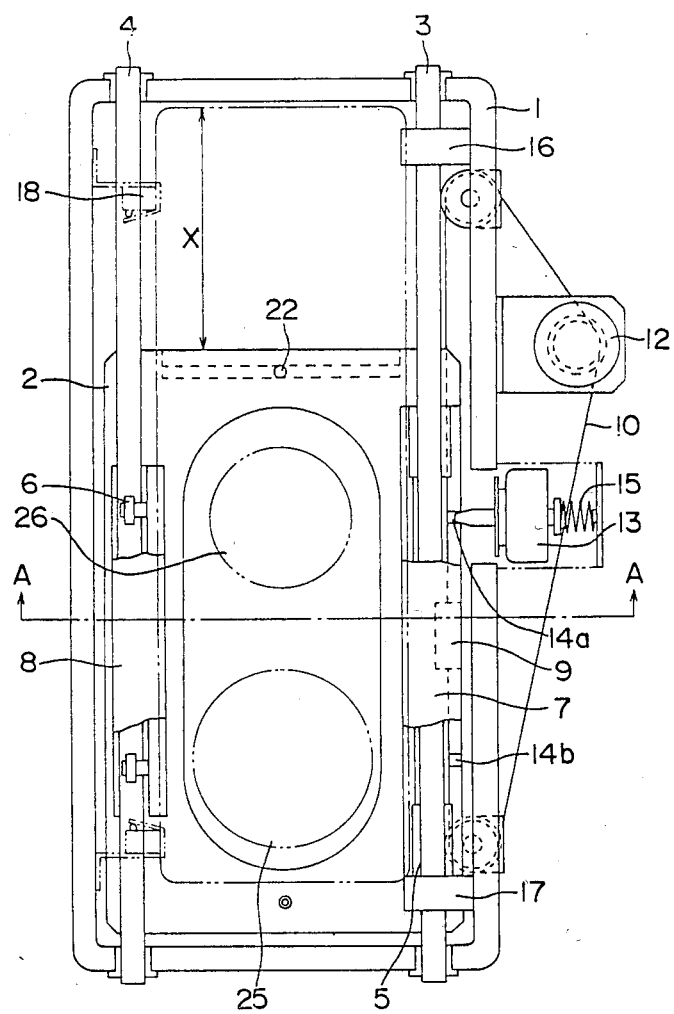
FIG. 1 is a plan view showing an embodiment of a lens-interchange member of a photographic printing apparatus which switches interchangeable lenses in a sliding manner.
Figure 2:
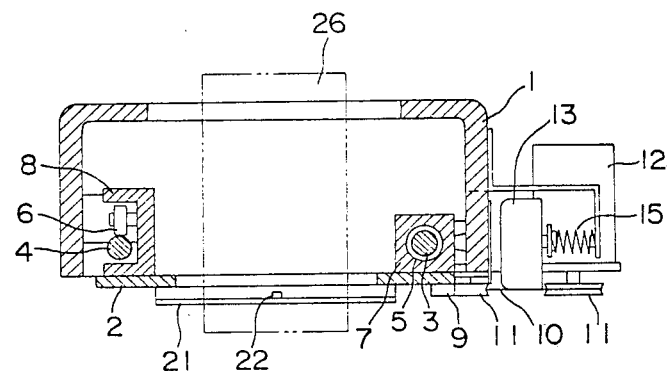
FIG. 2 is a sectional view along the line A—A of the embodiment shown in FIG. 1.

FIG. 1 illustrates an embodiment of the lens-interchange member of the photographic printing apparatus which switches between interchangeable lenses for full size and half size, including at least one image-rotating lens, in a sliding manner, and FIG. 2 shows a sectional view along the line A—A of the embodiment shown in FIG. 1.

First, an explanation will be made of the interchange mechanism for the above lenses based on FIGS. 1 and 2. The photographic printing apparatus has a fixed outer frame 1 for the lens-interchange member, to which a slide shaft 3 and a slide shaft 4 are fixed.

A sliding block 7 is fitted to one side of an interchange board 2 for the interchange lenses, and it can be moved along the slide shaft 3 via a guide hole 5. A guide block 8 is fitted to the other side of the interchange board 2 so that it can move along the slide shaft 4 through a guide roller 6 provided on the block. The interchange board 2 moves smoothly along the shafts 3 and 4 through the guide hole 5 and the guide roller 6.

FIG. 1 shows the state in which an image-rotating lens 26 for half size film is at a position in which it is aligned with the optical printing axis. In this state, the interchange board 2 touches a stopper 17 fitted to the outer frame 1 of the interchange member, while the end of a solenoid 13, pushed by a compression spring 15, engages with a pin hole 14a on the slide block 7 to lock it.

When a full size picture is printed, the interchange board 2 must be moved through the distance X so that an image-rotating lens 25 for full size film is aligned with the optical printing axis.

The interchange board 2 is moved by a wire 10, both ends of which are fixed to the board 2 by a wire attachment plate 9. The wire 10 is stretched by guide rollers 11 and wound round an intermediate roller directly connected to a motor 12. When the interchange board 2 is moved to the position for full size printing, the solenoid 13 is excited to release the end thereof which was engaged with the pin hole 14a and the motor 12 is operated in the prescribed direction.

The interchange board 2 moves through X and touches a stopper 16. On the completion of this movement, an end signal is generated from a switch 18 to stop the motor 12 and to release the solenoid 13 which was excited, and the end thereof engages with a pin hole 14b by the compression spring 15 to lock it. The movement from the position for full size printing to that for half size printing is conducted in a similar way.

Figure 3:
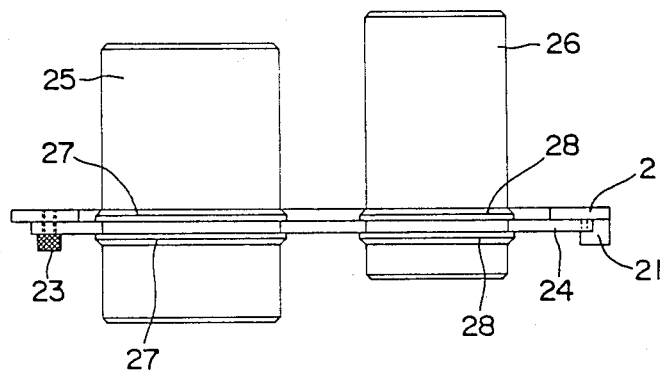
FIG. 3 is a side view of a lens board fitted with the lenses.

FIG. 3 shows an image-rotating lens 25 for full size film and an image-rotating lens 26 for half size film fitted to a lens board 24 by attachment rings 27 and 28. The lens board 24 is positioned by a lens board guide 21 and a pin 22 fitted to the rear of the interchange board 2 and is fixed by a fixing screw 23.

When a replacement or adjustment of the lenses is needed because of an alternation of the print size or the like, the fixing screw 23 is unscrewed to remove the lens board 24 from the interchange board 2.

Figure 4A:
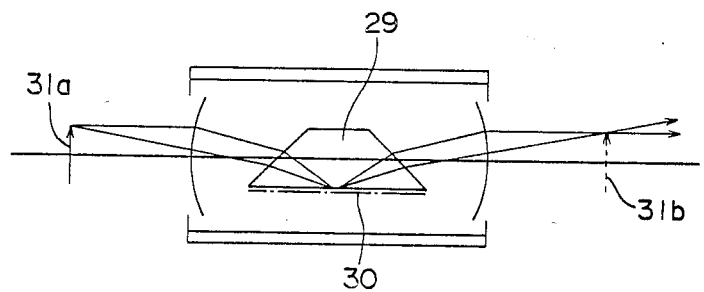
FIGS. 4(a) and 4(b) are each drawings explaining the principle of the image-rotating lens.
Figure 4B:
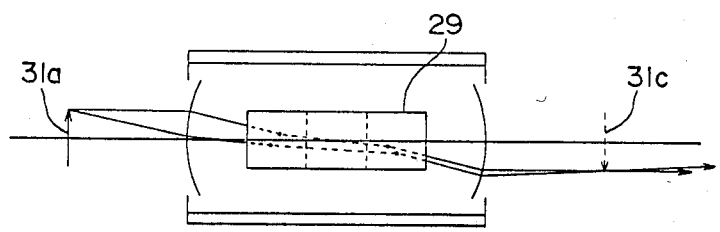

FIGS. 4(a) and 4(b) are drawings explaining the principle of the image-rotating lenses. When the lens shown in FIG. 4(a) is rotated through an angle of 90 degrees, the state shown in FIG. 4(b) occurs and the image is rotated through 180 degrees. A pentagonal roof Dove prism 29 is incorporated in the image-rotating lens, the bottom surface 30 of the Dove prism is a reflection plane obtained by the application of a completely reflective spatter process.

When the image-rotating lens is positioned as shown in FIG. 4(a), the image 31b projected onto photographic paper obtained by the projection of an image 31a on a negative by the reflection plane 30 is the same normal projected image as the image on the negative 31a.

When the image-rotating lens is rotated through an angle of 90 degrees clockwise as shown in FIG. 4(b), the image 31c projected onto the photographic paper becomes an inverted image. That is, the image projected onto the photographic paper is obtained by a 180-degree rotation composed to the rotation through 90 degrees of the lens.

Figure 5:
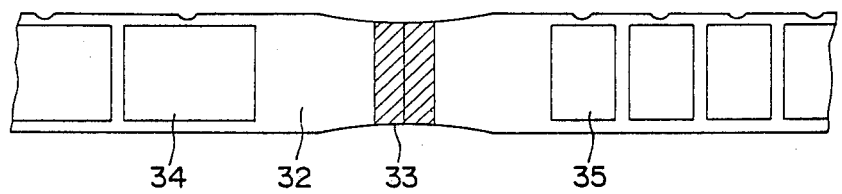
FIG. 5 is an illustration of a long film prepared by joining full size and half size films by a splicing process.

As shown in FIG. 5, when full size pictures 34 on a negative film 32 are joined to half size pictures 35 by a splice tape 33, the length-to-breadth ratios of the full size and half size pictures is reversed on the film. This length-to-breadth ratio of the projected images of the film pictures of both sizes on the printing paper sheet can be made to be the same by arranging the image-rotating lens 25 for full size and the image-rotating lens 26 for half size on the lens board 24 with their angles of attachment rotated through 45 degrees and by removing and interchanging them according to the size of the picture. Moreover, prints of the same print size can be obtained both from the full size pictures 34 and the half size pictures 35 and thus photographic paper of the same roll width can be used, by using two lenses whose focal distances are so designed that the projected images of the pictures of both film sizes have the same size, and by adjusting these lenses onto the lens board 24.

In the above embodiment, the image-rotating lens 25 for full size and the image-rotating lens 26 for half size are employed as the lenses for the full size pictures 34 and for the half size pictures 35, respectively. If the pictures of either of the sizes were rotated through 90 degrees, one image-rotating lens for the picture size being rotated would suffice. However, since there is an reflection plane 30 inside the image-rotating lens as shown in FIG. 4(a), the phenomenon occurs that the right and left of the projected image are reversed between conventional lenses and the image-rotating lens. Therefore, when conventional lenses and an image-rotating lens are employed simultaneously, it becomes necessary to print from the reverse of the emulsion surface of the film, as well as interchange the lenses. In view of this disadvantage, two image-rotating lenses are employed in the present embodiment.

INDUSTRIAL APPLICABILITY

As explained above, the present invention makes it possible to interchange lenses very simply and to obtain prints of the same size on photographic paper with ease from photographic films both of full size and of half size.

For the negatives employed in the present invention, a similar effect can also be obtained in a photographic printing apparatus of a type wherein a single negative or negative film cut into lengths of several frames is conveyed to the printing position automatically or manually, in the same way as in the case when one long negative film prepared by splicing full size pictures and half size pictures together is employed as shown in FIG. 5.

We claim:

1. In a photographic printing apparatus wherein full size and half size pictures on a negative film are introduced into a printing position and printed on substantially full size photographic papers, the improvement comprising
    a first image rotating lens for said full size pictures, said first lens having a first prism with a first reflecting surface,
    a second image rotating lens for said half size pictures, said second lens having a second prism with a second reflecting surface, and
    means for selectively positioning said first and second image rotating lenses into said printing position such that, when set in said printing position, said second image rotating lens is set so that it is displaced 45° around its central axis relative to said first image rotating lens when said first lens is in said printing position, whereby half size printed images are rotated 90° relative to said full size printed images.

2. The apparatus of claim 1 wherein said first and second image-rotating lenses are mounted movably on a single lens board.

3. The apparatus of claim 2 wherein said lens board is interchangeable.

4. The apparatus of claim 1 wherein said first and second prisms are Dove prisms.

5. The apparatus of claim 4 wherein said Dove prisms are pentagonal roof Dove prisms.

6. The apparatus of claim 1 wherein said image rotating lenses are selected so that said printed images resulting from said full size pictures and said half size pictures are substantially the same size.

7. The apparatus of claim 1 wherein said first and second prisms are rotated about their respective central axes as they are brought in and out of said printing position.

* * * * *